Feb. 28, 1939. C. SAUZEDDE 2,148,776

FRONT AXLE WHEEL AND BRAKE ASSEMBLY

Filed April 29, 1936 3 Sheets-Sheet 1

INVENTOR
Claude Sauzedde,
BY
ATTORNEYS

Patented Feb. 28, 1939

2,148,776

UNITED STATES PATENT OFFICE 2,148,776

FRONT AXLE WHEEL AND BRAKE ASSEMBLY

Claude Sauzedde, Detroit, Mich., assignor to Detroit Hydrostatic Brake Corporation, Detroit, Mich., a corporation of Michigan Application April 29, 1936, Serial No. 76,939

9 Claims. (Cl. 188—194)

The present invention relates to braking wheels for automotive vehicles and more particularly to wheels mounted for steering purposes on the spindle of a steering knuckle such as is ordinarily employed for supporting the front wheels of automotive vehicles.

The primary object of the present invention is to provide a wheel hub structure which is so constructed that it comprises a housing or enclosure for a brake mechanism, preferably a hydraulic brake mechanism, the hub structure also embodying angular or oblique wall portions comprising braking surfaces adapted to be frictionally engaged by the shoes of the brake mechanism contained within said hub, and in combination with such structure means for mounting said hub upon the spindle or stub shaft of a steering knuckle and for supporting a brake mechanism with respect to the hub so that the shoes of such mechanism are adapted to engage the braking surface within the hub.

Another object of the present invention is to provide a braking wheel structure wherein a wheel hub formed of inner and outer sections is supported upon an axle or spindle carried by a steering knuckle, the outer section being supported by anti-friction bearings upon the axle or spindle and the inner section having an axial opening permitting a spider formation, which is fixed to the knuckle, to extend into the hub structure for the purpose of supporting a braking mechanism therein. Several advantages result from such structure inasmuch as by forming the spider in the nature of an annular body the outer wheel section may be supported by anti-friction bearings disposed adjacent to the outer end of the spider or it may be supported by two sets of bearings so spaced apart that one set engages the spindle adjacent to its outer end and the other set engages the spindle at a point adjacent to its point of attachment with the steering knuckle. In the latter case the inner set of bearings are accommodated within the confines of the annular spider, which thus makes such an arrangement possible. The stability of the wheel mounting may be increased in such a combination by mounting the inner disk through anti-friction bearings, preferably needle bearings, upon the spider which supports the brake mechanism, this feature being desirable in connection with the heavier types of automobiles or other vehicles. In the case of lighter vehicles the bearings between the inner hub section and the spider may be dispensed with and the means provided on the inner section to accommodate such bearings utilized for the reception or sealing means, but it will be noted that even when the needle bearings are present sealing means are also employed both for protection of the bearings and brake mechanism contained within the hub.

Another object of the present invention is to provide a spider for the support of a brake mechanism within a wheel hub so constructed that in addition to comprising the hub of a wheel it also comprises a brake drum, the spider being so designed that it is adapted for attachment to the steering knuckle of a conventional front axle motor vehicle assembly so that the spindle usually provided thereon extends thereinto and receives the bearings and the hub portions supported by such bearings, thus providing a structure wherein the spider provides for efficient sealing of the brake drum to protect the mechanism contained therein and also as an additional bearing surface for the hub of the wheel in cases where the load conditions makes such additional bearing surfaces desirable.

With the above and other ends in view the invention consists in matters hereinafter more particularly set forth with reference to the accompanying drawings in which Figure 1 is a vertical section;

Like characters of reference are employed throughout to designate corresponding parts.

Figures 1, 3:
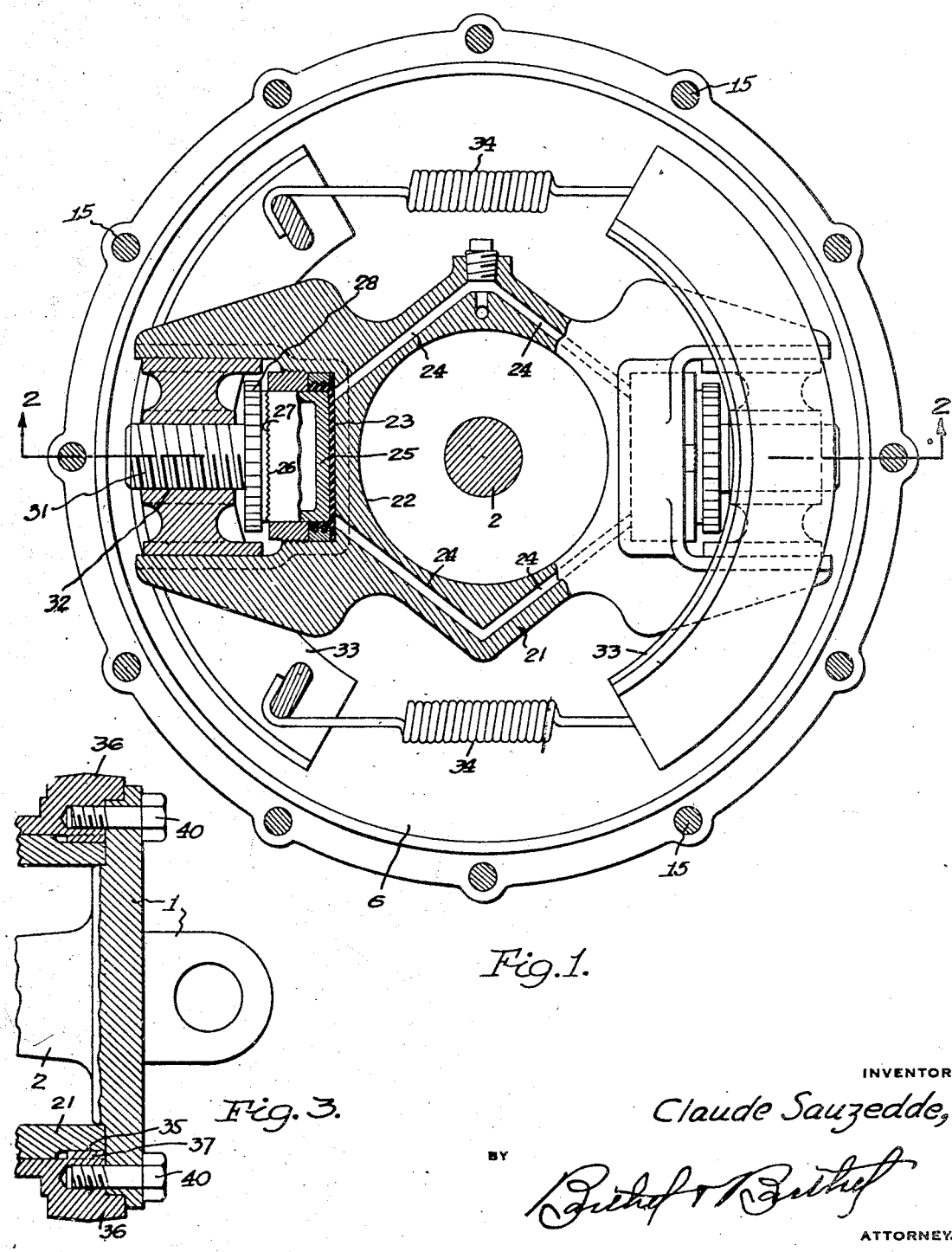
Fig. 3 is a fragmental section of a detail.
Figure 2:
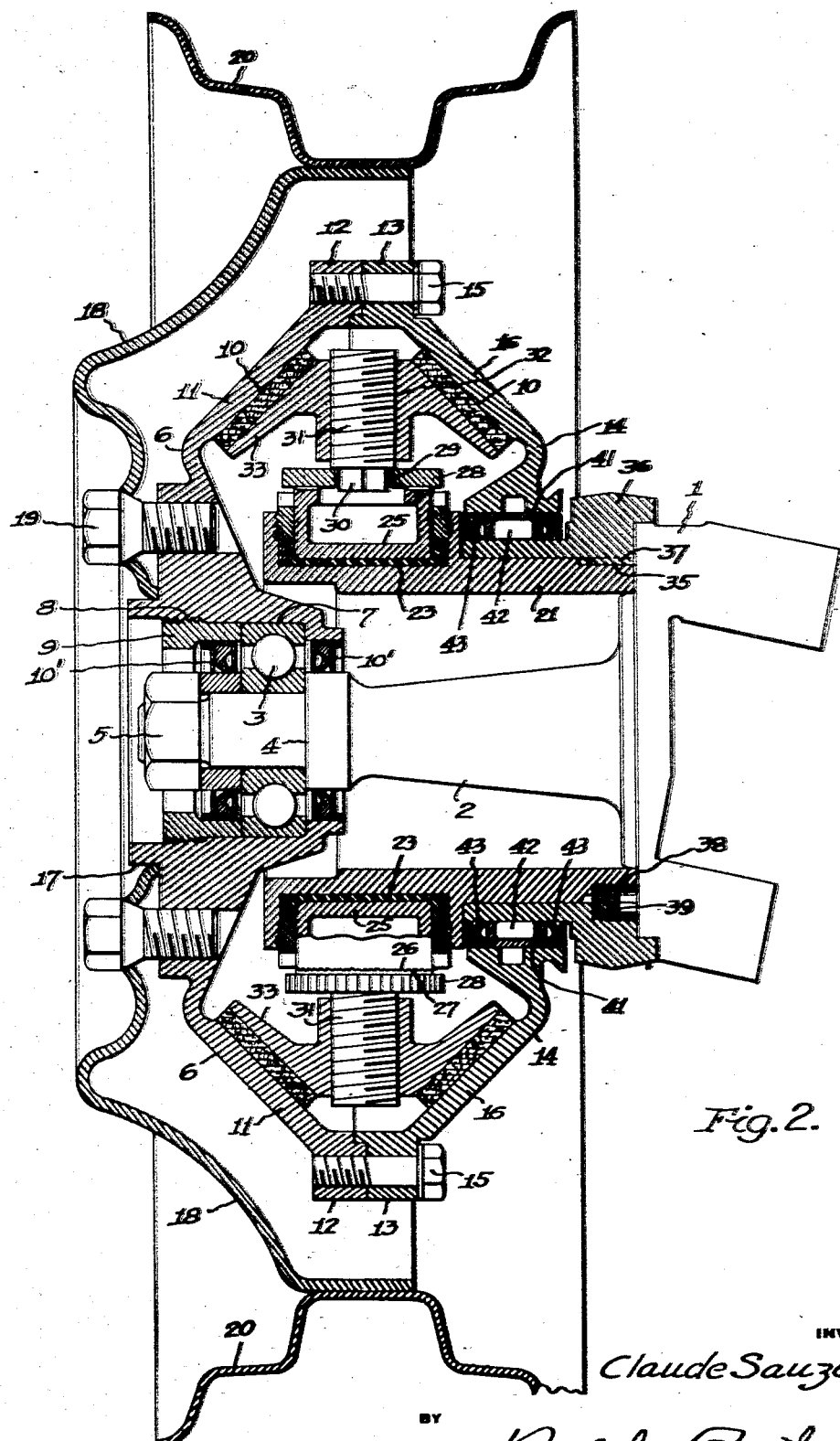
Fig. 2 is a section taken on the line 2—2 of Fig. 1.

Referring to Figs. 1 to 3 the numeral 1 designates a conventional steering knuckle such as is well known in connection with the automotive vehicle art. Mounted upon the knuckle 1 is a rigid spindle or stub shaft 2 carrying bearings 3 at the outer end thereof, the bearings being secured in place against a shoulder 4 on the spindle 2 by a removable nut 5. A wheel hub structure has an outer section 6 formed with an axially located annular portion 7 receiving the bearings 3 and with the screwthreaded portion 8 receiving a retainer 9 which locks the outer hub section on the bearings. Dust and lubricant seals 10' are provided on each side of the bearings 3. The outer section 6 has an oblique wall 11 with the peripheral part 12 secured to a similar part 13 on the inner hub section 14 by securing elements 15. The inner section 14 likewise is an oblique wall 16 oppositely disposed with respect to the wall 11. The inner surfaces 10 of the walls 11 and 16 constitute braking surfaces.

The outer section 6 of the hub has an annular portion 17 providing a centering means for a disk structure 18 which is secured thereon by means of removable elements 19 and which carries a tire supporting rim 20.

A spider 21 has a central opening 22 of a diameter considerably larger than the diameter of the spindle 2 and is formed with pressure chambers 23 adapted to receive fluid under pressure from passages 24. In each chamber 23 is a piston 25 adapted to be moved therein in response to fluid pressure. The outer end of the piston is provided with ratchet teeth 26 for engagement with similar ratchet teeth 27 on a rotatable element 28. The element 28 has a centrally disposed angular opening 29 therein into which the angular end 30 of a screw 31 extends. The screw 31 is received in the screwthreaded bore 32 on the brake shoes 33 and functions to transmit the pressure from the piston 25 to the shoes to press them into engagement with the braking surfaces of the walls 10 and 16. Springs 35 are connected to the shoes to normally retract the same.

The inner end of the spider 21 is provided with teeth formations 35 and an annular body 36 provided with similar teeth 37 is received on the end of the spider 21 in such manner that the teeth 35 and 37 interlock to prevent relative rotation. The annular member 36 is preferably formed of a hard metal whereas the spider 21 may comprise a casting. The two parts 21 and 36 are held together after assembly by drilling and tapping a hole 38 in such manner that it extends equally into both parts and subsequently inserting a screw 39 therein. The annular member 36 is secured to the knuckle 1 by bolts 40 as indicated in Fig. 3.

The inner hub section 14 has an axial opening 41 which when the hub is assembled on the spindle as above described surrounds the end of the annular member 36. Needle bearings 42 are provided between the surface 41 and the outer surface of the annular member 36 and dust or lubricant seals 43 are provided at each side of the needle bearings.

Figure 4:
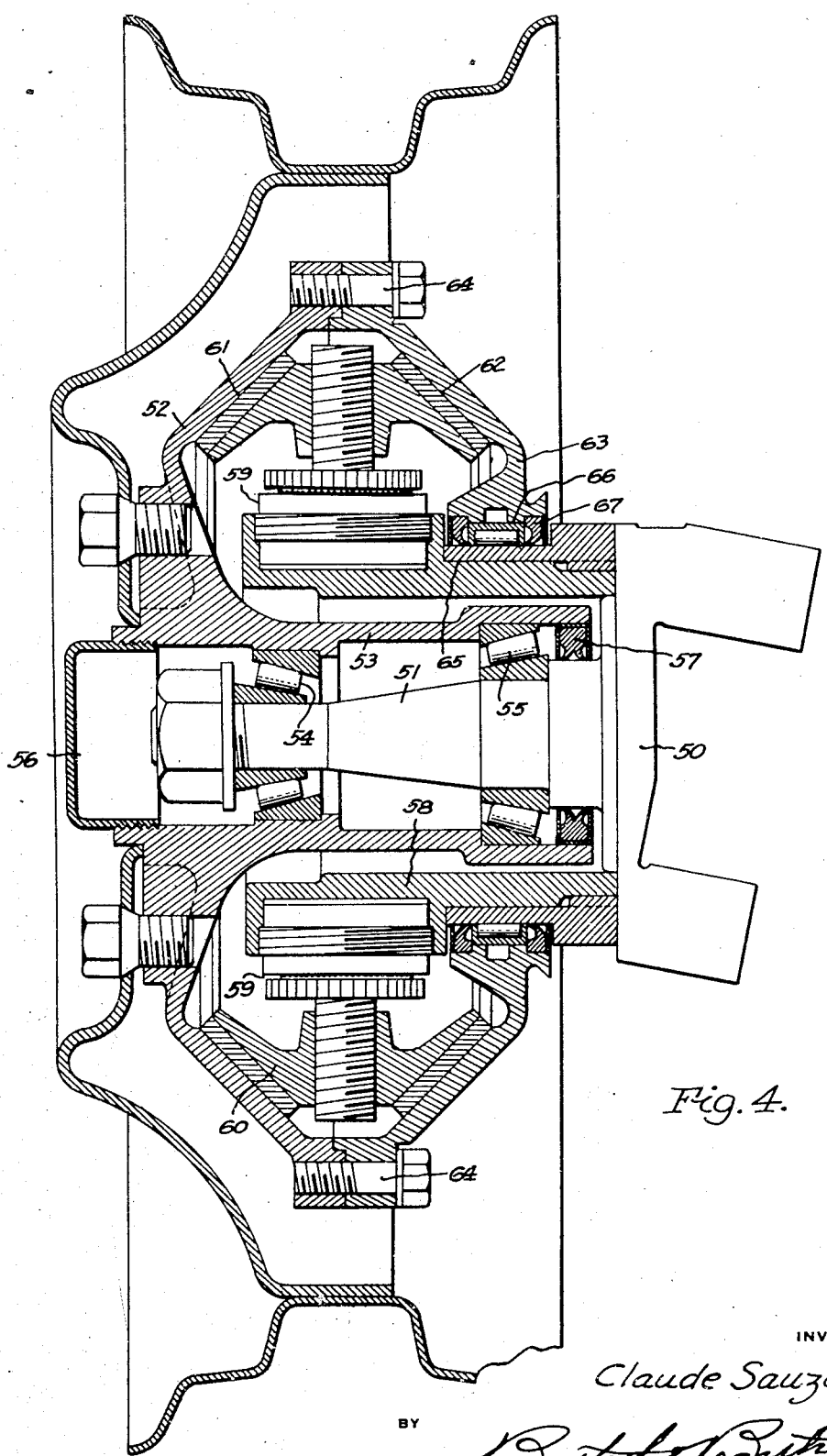
Fig. 4 is a section similar to Fig. 2 illustrating a modified wheel mounting.

Referring to Fig. 4 the numeral 50 designates a steering knuckle having a rigid spindle 51. The outer section 52 of the hub shown in this view has an axial extension 53 extending inwardly thereof and surrounding the spindle 51. Anti-friction bearings 54 are mounted on the spindle adjacent to its outer end and engage the inner surface of the extension 53 and anti-friction bearings 55 are mounted adjacent the inner end of the spindle to engage the extension 53 at a point nearer its terminal. A grease cap 56 is retained in the outer end of the extension 53 and a dust and lubricant seal 57 is provided at the inner end of the extension 53.

Mounted upon the knuckle 50 is a spindle 58 carrying hydraulic means generally designated 59 for moving the shoes 60 into engagement with the braking surfaces 61 and 62 within the outer hub section 52 and the inner hub section 63 respectively. The two sections 52 and 63 have their peripheries secured together by bolts 64. The spider 58 is rigidly secured to the knuckle 50 and supports needle bearings 65 for engagement with the wall of an axial opening 66 in the inner section 63 of the hub. On each side of the needle bearings 65 are provided dust or lubricant seals 67.

In the form illustrated in Fig. 2 the additional bearing surfaces provided by the bearings 41 upon the spindle tend to increase the stability of the wheel mounting and is desirable when a single bearing such as that shown at 3 is provided for the outer disk 6. However when a double bearing arrangement is provided such as shown at 54 and 55 the hub mounting is such as to incorporate a high degree of stability and in cases where the wheel is used upon lighter automotive vehicles the needle bearings 66 may be dispensed with in which case sealing means would be provided in the opening 66 such as shown at 67.

As will be understood, the assemblage is such as to provide a closed chamber for the braking mechanism, the outer section of the hub assembly being supported by the spindle while the inner section of the hub assembly co-operates with the annular body or braking mechanism support 21 to complete the closed effect to the chamber. By the use of the dust excluders which are utilized in connection with both sections, and the fact that the body 21 is itself secured to the knuckle, renders the interior of the brake mechanism chamber free from all liability of the entrance of dust, etc., to affect the braking operation or the free running of the wheel on the knuckle assembly.

Although specific embodiments of the invention have been illustrated and described it will be understood that various changes may be made within the scope of the appended claims without departing from the spirit of the invention and such changes are contemplated.

What I claim is:

1. In braking mechanism for steering wheels, wherein the braking mechanism is of the hydraulic type with the co-operative braking surfaces disposed in approximate symmetry to the median line of the steering wheel, the combination with a steering knuckle carrying a spindle, of an annular braking-mechanism support secured to and projecting from the knuckle in symmetrical overlying relation to the spindle and spaced therefrom, and a hub assembly of the wheel carrying the rotatable braking surfaces, said hub assembly being formed of inner and outer sections secured together and overlying the braking mechanism with the outer section supported by the spindle and the inner section overlying the annular support and co-operating therewith to complete a closed chamber for the mechanism, said outer section having a zone extending into the space between the spindle and annular support to provide an overlapping relation therebetween.

2. An assembly as in claim 1 characterized in that the outer section is formed with a central bore for the passage of the outer end of the spindle, the wall of the bore and the spindle end being formed to receive an antifriction bearing therebetween to form the support for the section on the spindle.

3. An assembly as in claim 1 characterized in that the outer section is formed with a central bore to receive the spindle in spaced relation, the bore and spindle having relative formations to receive a pair of antifriction bearings therebetween with the bearings lengthwise of the spindle to provide a pair of supports for the section upon the spindle.

4. An assembly as in claim 1 characterized in that the annular mechanism support includes a plurality of chambers operatively connected together for the passage of the operating fluid thereto and to and from a source of fluid pressure supply, each chamber being operative to provide brake shoe movement to and from engagement with the braking surfaces by the fluid activity within the chamber.

5. An assembly as in claim 1 characterized in that the annular mechanism support includes a plurality of chambers operatively connected together for the passage of the operating fluid thereto and to and from a source of fluid pressure supply, each chamber being operative to provide brake shoe movement to and from engagement with the braking surfaces by the fluid activity within the chamber and with the brake shoe movements applied radially in the assembly.

6. An assembly as in claim 1 characterized in that the annular mechanism support carries and includes a plurality of piston chambers operatively connected with a source of fluid pressure supply, and adjustable operating connections between a piston and the brake shoe unit to regulate the relationship between the brake shoes and the braking surfaces in inactive and active positions of the shoes, with the chambers active to shift the units to and from active positions.

7. In braking mechanism for steering wheels, wherein the braking mechanism is of the hydraulic type with the co-operating braking surfaces disposed in approximate symmetry to the median line of the steering wheel, the combination with a steering knuckle carrying a spindle, of an annular braking-mechanism support secured to and projecting from the knuckle in symmetrical overlying relation to the spindle and spaced therefrom, and a hub assembly of the wheel carrying the rotatable braking surfaces, said support carrying the stationary portion of the braking mechanism and provided with fluid-supply channel means adapted to control the activity of the braking mechanism, said hub assembly being formed of inner and outer sections secured together and overlying the braking mechanism with the outer section supported by the spindle and the inner section overlying the annular support and co-operating therewith in completing a closed chamber for the mechanism, said outer section having a zone extending into the space between the spindle and annular support to provide an overlying relationship therebetween.

8. An assembly as in claim 7 characterized in that the outer section is formed with a central bore for the passage of the outer end of the spindle, the wall of the bore and the spindle being formed to receive an antifriction bearing and sealing means therebetween to form the support for the section on the spindle and to complete the closed braking chamber.

9. An assembly as in claim 7 characterized in that each hub section carries a braking surface with the surfaces of both sections active with the braking mechanism during activity of the latter with such activity of the braking mechanism provided by mechanism movements radially of the wheel.

CLAUDE SAUZEDDE.